Dec. 9, 1958 E. K. DIEHL ET AL 2,863,354
TURBIDIMETER
Filed Sept. 29, 1953

INVENTORS
Robert E. Matty
Erle K. Diehl
William T. Hage
BY
J. P. Moran
ATTORNEY

United States Patent Office 2,863,354
Patented Dec. 9, 1958

2,863,354

TURBIDIMETER

Erle K. Diehl, William T. Hage, and Robert E. Matty, Alliance, Ohio, assignors to The Babcock & Wilcox Company, New York, N. Y., a corporation of New Jersey Application September 29, 1953, Serial No. 383,098

1 Claim. (Cl. 88—14)

This invention relates in general to meters and, more particularly, to a meter for measuring turbidity, or the relative amount of light that a substance will obscure.

Previously, turbidity indications have been determined in the laboratory using complex testing procedures and apparatus which were varied in accordance with the particular desires of the tester. In many instances these testing procedures are of long duration and the results therefrom are not reliable due to the variation in procedures.

In a great many instances in which turbidity is to be determined, it is desirable to achieve quick, uniform, and accurate indications in locations where complex laboratory equipment is not ordinarily available. In the testing of boiler flue gases, for example, it is usually necessary, or desirable, to make turbidity determinations at the location of the boiler. Such determinations are used, for example, to indicate the amount of sulfur trioxide present in boiler flue gases by measuring the turbidity resulting from a chemically induced precipitate in a sample made up of boiler flue gas constituents which have been dissolved in a liquid solution, and comparing this turbidity with that of a similarly induced precipitate in a solution containing a known quantity of sulfur trioxide. A comparison of the turbidity of the aforementioned solutions will give a good indication of the sulfur trioxide present in the flue gases of the boiler and this will reveal the tendency of these gases to form a slag on the boiler surfaces.

In view of the foregoing, it is desirable to have a simple, portable, compact turbidity indicator which may be used at any location for the frequent testing of boiler flue gases or other similar testing.

Accordingly, it is an object of this invention to provide a compact turbidity meter which may be repeatedly used to give accurate and uniform indications of the turbidity of substances without major adjustment, and which is of simple construction and easy to operate.

A further object of the invention is to provide a turbidimeter which measures the turbidity of a substance by measuring the degree to which light is obscured by the substance when light is passed longitudinally through an elongated volume of the substance.

A still further object is to provide a portable turbidimeter which contains its own source of power and means for varying light intensity, and which is thus a complete, compact and self-contained unit which can be used at any testing location.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which is illustrated and described preferred embodiments of the invention.

Figure 4:
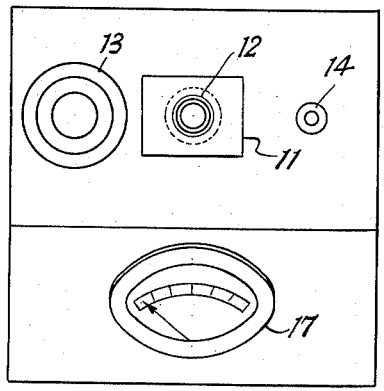
Fig. 4 is a plan view of the turbidimeter shown in Fig. 1.
Figure 2:
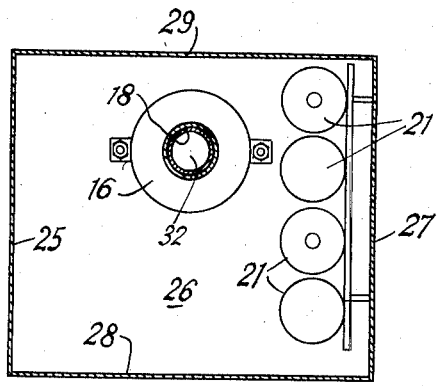
Fig. 2 is a horizontal sectional view taken on the line 2—2 of Fig. 1.
Figure 1:
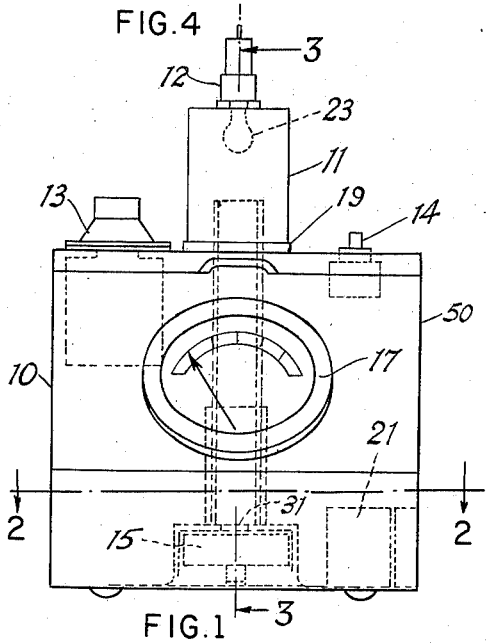
Fig. 1 is a front elevation view of a turbidimeter constructed in accordance with the invention.
Figure 3:
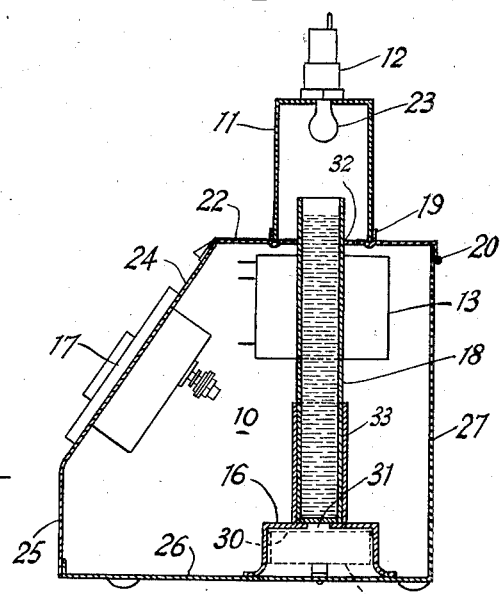
Fig. 3 is a vertical sectional view taken on the line 3—3 of Fig. 1.

Referring to the drawings, a turbidimeter constructed in accordance with the invention is generally indicated at 10. As will be described more in detail hereinafter, this turbidimeter is a portable, completely self-contained unit, including a carrying case or casing which serves to mount and support all the essential elements of the turbidimeter. For example, the casing has mounted in a face thereof a meter connected in the output circuit of the photocell. The latter is mounted within the casing on one wall thereof, and the opposite wall of the casing has an aperture aligned with the photocell. A light box or other enclosure containing a lamp bulb or the like is mounted in closing relation on this wall in such a manner that the light from the lamp bulb will pass through the aperture toward the photocell. The photocell casing has mounted thereon a support arranged to removably receive a test tube or similar transparent container for the substance to be tested, this container being supported by the means on the photocell in a position interposed between the light source and the photocell. The container is so positioned that the light passes longitudinally through the substance therein, whereby differences due to stratification are substantially neutralized. The casing also encloses a battery of dry cells for energizing the light source and has mounted thereon a rheostat controlling the light intensity and a switch for connecting the lamp to the battery.

Referring more particularly to the drawings, the casing 50 may be constructed of metal, or other similar opaque material, and is generally of rectangular shape. The casing includes a bottom wall 26, a rear wall 27, side walls 28 and 29, a front wall portion 25 perpendicular to the bottom wall and a sloping front wall portion 24 connecting vertical front wall portion 25 to top wall 22. The latter has an aperture 32 therein for a purpose to be described. Preferably, top wall 22 is hinged to rear wall 27 as at 20, for access to the interior of case 50. To cut light reflection, the inside of case 50 is preferably finished with a non-reflecting black surface.

The photoelectric cell 15 is mounted within a small enclosure 16 secured to the bottom wall 26 of casing 50, and the upper wall of this enclosure has an aperture 31 vertically aligned with aperture 32 in top wall 22. A tubular support 33 is secured to enclosure 16 and extends upwardly therefrom in axial alignment with aperture 32. The inner diameter of support 33 is larger than the diameter of aperture 32, so as to provide a supporting ledge at the juncture between enclosure 16 and support 33. Support 33 is arranged to receive and support a translucent test tube, or other suitable elongated translucent container 18 containing the substance to be examined. This container is inserted into support 33 through the aperture 32 in top wall 22.

The enclosure 16 covers all the photoelectric cell except a small portion of the light sensitive surface 30 which is exposed by the aperture 31. The light sensitive surface 30 has the property, in conjunction with other elements making up the cell, of generating small current in proportion to the light falling upon it. The aperture 31 is of a small enough diameter to insure that light reflected from the walls of the container is not transmitted to the sensitive portion of the cell and to eliminate the passage of light from the lamp along or through the sides of the sample tube and into the photocell. For this reason the diameter of the aperture is made smaller than the internal diameter of the sample container 18.

A removable rectangularly shaped light box 11 is normally positioned directly over the test container 18 fitting into a recessed portion 19 on the top wall 22 which is lined with felt strips to prevent admission of outside light. The light box is made of metal, or similar opaque material and is large enough to cover the aperture 32 on the casing top wall 22. On the inside of the light box, at the top and in a position which is centrally aligned and above the normal test container position, is an electric socket or receptacle 12 mounting a lamp bulb 23. The socket 12 is mounted into the light box 11 in such a way that the electrical connections extend outside and the light 23 is completely "light-sealed" within. The box is always positioned in the recessed portion 19 so that the distance between bulb 23 and photocell 15 remains constant. The light bulb 23 should be of the same size, shape, and power rating for related testing.

A group of dry cell batteries 21 are mounted along the rear wall 27 of the casing 50. These batteries furnish the power to light the bulb 23. A variable resistance 13 to vary the light intensity, and a circuit breaker button 14 to open or close the circuit, are electrically connected in series with the light and the batteries. Both of these are mounted in the casing top wall 22. A microammeter 17, which is electrically connected to the photoelectric cell 15 to indicate any current which may be generated by light hitting the exposed portion of the cell, is mounted in the inclined portion of the front of the casing.

Figure 5:
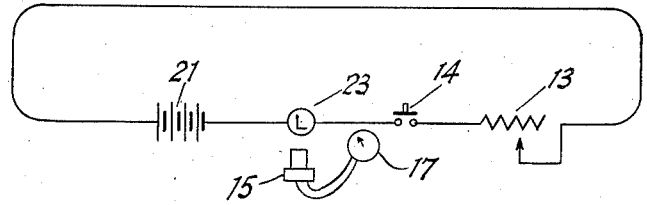
Fig. 5 is a schematic wiring diagram of the electrical circuit for the turbidimeter shown in Fig. 1.

Referring to the schematic electrical wiring diagram of Fig. 5, dry cell batteries 21 are connected together in series with each other and with light source 23, circuit breaker 14, and variable resistance 13. The photocell 15 is shown below the light source 23 from which it receives energy by the vertical transmission of the light through a test solution. The current generated by it is indicated by the microammeter 17 which is connected to it.

In the ordinary testing procedure using the invention, the test sample tube is filled to a predetermined and fixed point which is marked off on the tube. This same volume as indicated by the marked point on the tube is used for all testing. By keeping the height, and therefore the quantity, of test solution constant for all testing, the distance which the light must travel from the bulb, which is fixed in the light box, through the solution to the photocell also remains constant and there is no need to make any adjustment of the instrument for successive testing. To eliminate an error which would occur if the light intensity varied, it is possible with the invention to adjust the light intensity to an amount which is constant for all testing. This is done by placing a tube containing a standard clear test solution in the normal test position over the photocell, and regulating the variable resistance until a maximum scale reading registers on the microammeter. This procedure is followed whenever test determinations are to be made. In the event that the maximum reading on the microammeter scale cannot be obtained with all the resistance cut out, then the batteries must be replaced.

Once the light intensity is set at a value which is constant for all testing, a test solution is placed in the tube, the light box placed over the tube and a reading taken from the microammeter without any further adjustments. This reading will indicate the amount of light that penetrates the test solution. When it is desired to use the instrument to measure turbidity of a substance it is merely necessary to compare the ammeter reading of the test sample with that of a clear sample. The difference in readings will indicate the relative turbidity of the test substance.

The invention provides for the vertical passage of light through the test solution in order to give an indication of the opacity of the entire solution, which indication will not vary due to gravity effects. Since the opacity or turbidity of a solution depends on the number of finely divided solids suspended in the solution, it is apparent that due to the effects of gravity the solution would normally vary in turbidity from top to bottom. Therefore, in order to get an accurate indication of the turbidity existing throughout the solution, the instrument provides for a vertical light transmission through the solution from top to bottom. Thus, the instrument of the invention will not be influenced by any stratification in the solution. The vertical path used also makes it possible to use, in a compact instrument, a longer path of light travel with resulting greater instrument sensitivity than would be possible using another direction path of light travel.

While a specific embodiment of the invention has been shown and described in detail to illustrate the application of the invention principles, it will be understood that the invention may be embodied otherwise without departing from such principles.

What is claimed is:

A portable turbidimeter comprising a light impervious casing having a bottom wall, enclosing side walls and a top wall having an aperture therein, a photo-electric cell attached to the bottom wall in axial alignment with said aperture, a removable light impervious cover box enclosing said aperture to prevent any extraneous light from entering into said casing, a light source mounted in said cover box in axial alignment with said aperture and photo-electric cell, the light from said light source being the sole light arranged to be incident upon said photo-electric cell, a variable resistor mounted in said casing and connected in series with said light source to vary the intensity of the light source, an elongated open top receptacle for containing a test substance arranged to be removably mounted in said casing, said receptacle being positioned between said photo-electric cell and light source in light intercepting relationship therewith, a stand positioned above the photo-electric cell for receiving and positioning said receptacle in said casing in axial alignment with said photo-electric cell, aperture and light source, said receptacle when positioned in said stand projecting upwardly through said aperture so that the top of said receptacle extends into said cover box whereby the light rays from the sole light source pass vertically through the top of the receptacle and longitudinally through the entire body of the test substance, which is predominantly disposed in said light impervious casing, to be incident on said photo-electric cell, a cell battery positioned within the casing and disposed in the light circuit to provide said circuit with a steady current flow at constant voltage to insure a light of constant intensity to be passed through the body of the test substance and an energy output indicator mounted on said casing and connected to said photo-electric cell to accurately measure the amount of current generated by the light passing through the substance to the said photo-electric cell.

References Cited in the file of this patent

UNITED STATES PATENTS

| | | |
|---|---|---|
| 1,914,937 | Bodine | June 20, 1933 |
| 1,954,925 | Exton | Apr. 17, 1934 |
| 2,062,588 | Logan et al. | Dec. 1, 1936 |
| 2,157,438 | Sparks | May 9, 1939 |
| 2,255,034 | Bauer | Sept. 2, 1941 |

FOREIGN PATENTS

| | | |
|---|---|---|
| 529,309 | Germany | July 11, 1931 |
| 806,346 | France | Sept. 21, 1936 |